P. REED.
TIDE MOTOR.
APPLICATION FILED FEB. 12, 1915.
1,276,112.
Patented Aug. 20, 1918.
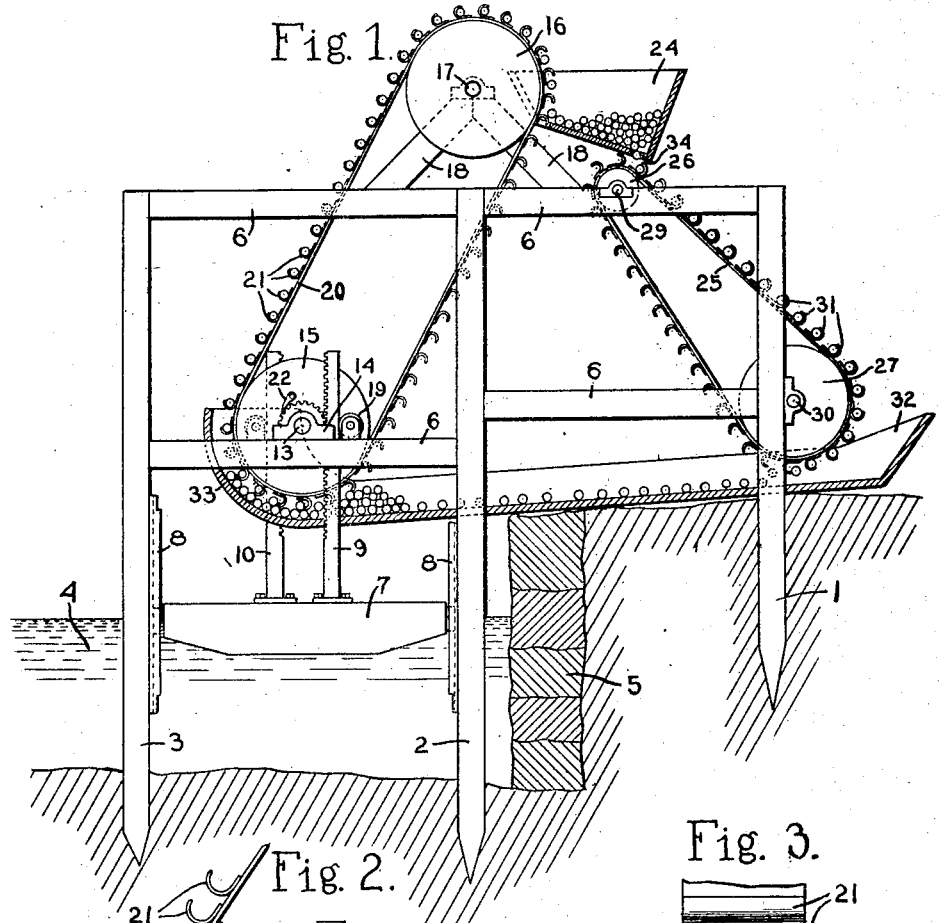
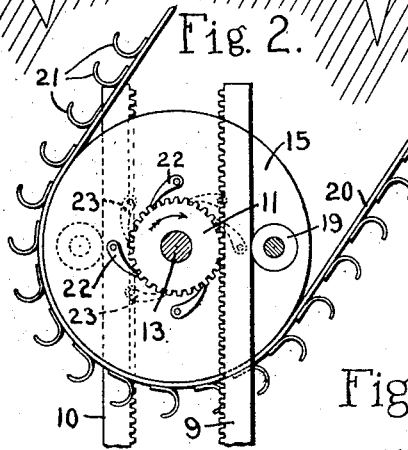
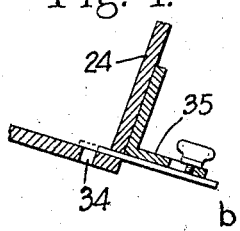
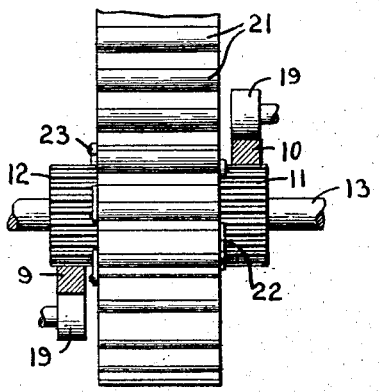
Witnesses.
J. Morrill Fuller
William E. Gagen
Inventor.
Peter Reed
by Heard Smith & Tennant.
Att'ys

UNITED STATES PATENT OFFICE.

PETER REED, OF QUINCY, MASSACHUSETTS.

TIDE-MOTOR.

1,276,112.   Specification of Letters Patent.   Patented Aug. 20, 1918.

Application filed February 12, 1915. Serial No. 7,905.

*To all whom it may concern:*

Be it known that I, PETER REED, a citizen of the United States, and resident of Quincy, county of Norfolk, State of Massachusetts, have invented an Improvement in Tide-Motors, of which the following description, in connection with the accompanying drawing, is a specification, like characters on the drawing representing like parts.

This invention relates to improvements in motors adapted to be operated by the rising and falling of a body of water such as the rising and falling of the tides.

As is well known the rising and falling of the tides recurs twice each day, the change in level of the water being relatively slow at the time the tide changes.

One of the objects of this invention is to provide means actuated by a float resting upon the surface of the water to generate power both during the rising and the falling of the tide.

Another object of the invention is to provide means whereby the excess of power generated during the interval while the tide rises rapidly may be stored and utilized during the period that the rise and fall is relatively slow.

Another object of the invention is to provide a tide motor or similarly operated device of relatively cheap construction and which may be made of sufficiently large capacity to supply so much power as is needed for shops or electric light plants or other power installations.

The preferred embodiment of the invention is illustrated in the accompanying drawings in which:

Figure 1 is a side elevation of a tide motor and mechanism for translating power generated by the rising and falling of the tide to a rotary motor adapted to be utilized in any well known manner, Fig. 2 is a detail side elevation of the mechanism shown in Fig. 1, and, Fig. 3 is a detail plan view of the same.

Fig. 4 is a detail elevation of the lower portion of the receptacle for the mobile articles showing the gate for controlling the delivery of the same.

As illustrated in the drawing the tide motor comprises a frame preferably constructed of a number of piles some of which are sunken into the earth adjacent to the sea-wall and others sunken in the bed of the stream or other body of water which is subjected to the rising and falling of the tides, the piles being connected together by suitable cross beams, braces, and the like of well known construction.

As shown in the drawings the piles 1 are driven into the earth adjacent the sea-wall and piles 2—3 sunken in the bed of the stream 4 preferably adjacent to the sea-wall 5. The piles 1, 2 and 3 are connected by suitable cross beams 6, the framework thus constructed being carried to any desired height.

The motor mechanism preferably comprises an endless carrier provided with a series of flights which desirably may be curved to receive balls, rollers, or other mobile devices. The endless belt is actuated by suitable mechanism connected to a float.

In the preferred embodiment of the invention disclosed herein a float 7, which may be of any desired size, is slidably supported in guides or ways 8 secured to or constructed within the piles 2—3, said guides being of sufficient length to hold the float in place throughout the maximum and minimum level of the tides.

A plurality of oppositely disposed racks 9—10 are secured to the upper surface of the float preferably at about its central portion, these racks engaging gears 11—12 rotatably mounted upon a shaft 13 which is supported in suitable bearings 14 upon suitable cross beams of the framework. The racks 9 and 10 may be maintained positively in contact with their respective pinions by anti-friction rollers 19 journaled in suitable stands supported by the cross beam and bearing against the rear side of the rack members. The shaft 13 is also provided with a cylindrical drum 15 rigidly secured thereto and which, together with a drum 16 supported upon suitable bearings 17 resting upon braces 18 upon the uppermost portion of the frame, serves as a support and means for actuating an endless carrier 20 which desirably is provided with a series of cup shaped horizontally disposed flights 21. By thus providing drums of large diameter for driving an endless carrier of great capacity enough heavy mobile articles may be elevated during the rising and lowering of the tide to furnish continuous power notwithstanding the slow movement of the tidal force.

One end of the drum 15 is provided with a series of pawls 22 adapted to engage the teeth of the pinion 11 but yieldingly mounted to permit rotation of the drum in one direction. The opposite head of the drum 15 is provided with a similar series of pawls 23 disposed in the opposite direction which engage the teeth of the drum 12.

It will be obvious from the construction thus described that the pinion 11 will be rotated in a clockwise direction through the rack 9 as the tide falls and that the pinion 12 will be rotated in the same direction through the rack 10 as the tide rises.

The pawls 22 and 23 are so disposed as to engage their respective pinions and transmit rotation to the drum in a clockwise direction and to permit the gears 11 and 12 to rotate idly when actuated in a counterclockwise direction, it therefore follows that both the rising and falling of the tide will transmit a clockwise movement to the drum 15 which will actuate the endless carrier 20 in such a manner as to cause the upper lead thereof to advance upwardly and the lower lead thereof as illustrated in Fig. 1 to advance downwardly. If the rising and falling of the tides were constant the power might be derived either from the shaft 13 or the shaft 17 but because of the variation in rapidity of the rise and fall of the tides it is desirable that sufficient potential power be stored to be available for the actuation of the power mechanism as the rising and falling of the tide diminishes or ceases.

The preferred form of mechanism for accomplishing this purpose comprises a series of mobile articles such as balls or rollers which are adapted to be raised by the flights 21 of the endless carriers and deposited in a suitable receptacle 24 at a sufficiently high elevation to permit their descent when carried by suitable means to deliver sufficient power to the power transmitting mechanism to maintain the speed of the latter constant.

The power transmitting mechanism as illustrated herein comprises and endless conveyer 25 journaled upon suitable drums 26 and 27, the drum 26 being supported upon a shaft 28 mounted upon the uppermost cross beam of the main frame and the drum 27 being supported upon a suitable shaft 30 supported upon the main frame at a much lower level than the shaft 26 so that the upper lead of the conveyer 25 will have a relatively steep inclination.

By reason of the fact that the rising and falling of the tides covers a relatively long period of time the means provided for storing up the energy must be such as to elevate as many heavy weights to the desired height as is possible. The power which may be derived from the rising and falling of the tides is practically limitless and as large a float as is practicable may be employed. The drum 15 through which the power of the tide is utilized to raise the weights should therefore be as large as practicable so that by a minimum number of revolutions it will raise the weight to the desired height. Conversely in utilizing the potential energy stored when a large number of weights have been accumulated the conveyer leading to the power transmission shaft should be carried upon relatively smaller pulleys or drums and the axial position of the conveyer should have a relatively steep inclination as above stated.

The conveyer 25 like the conveyer 20 is provided with a series of cup shaped flights 31 adapted to receive the balls so that the balls which are delivered from the storage receptacle 24 upon the conveyer 25 just as it passes over the pulley 26 will actuate the conveyer by gravity and thereby rotate the shaft 30 from which the power may be carried to any desired source. The balls or other mobile members which are delivered to the flights 31 of the conveyer 25 are discharged as the respective flights pass beneath the drum 27 into a chute 32 which is sufficiently inclined to return them into the path of the flights 21 of the conveyer 20. The chute 32 may as illustrated herein be in the form of a trough having an upwardly curved extension 33 adapted to form a pocket to receive and retain the balls in the path of the endless carrier or the chute 32 may be arranged so as to direct the balls into the end of the flights as they pass the chute in their upward movement.

It will be understood that the storage receptacle 24 may be a hopper or a platform of any desired size or character. It will also be understood that if desired the delivery mouth 34 of the hopper may be provided with a suitable gate 35 so that the rapidity of the delivery of the balls may be regulated or the power transmission mechanism rendered inactive while potential power is being stored by the delivery of additional balls to the storage receptacle.

Any desired means may be provided to permit the float to rise and fall without rotating the drum 15, thus causing the power generating mechanism to remain inactive. For example the racks may be detached from the float, or may be pivotally mounted on the float and means provided to withdraw them from contact with their pinions, or the pawls may be disengaged from the pinions to permit the latter to rotate freely upon the shaft.

While I have described the mobile articles, which are elevated by the endless conveyer 20 and permitted to descend upon the endless conveyer 21, as balls or rollers, it is to be understood that other mobile elements may be used, for example by obvious modifications water may be used in place of the mobile elements above referred to or any elements or devices may be used which may be accumulated and thereafter continuously released.

It is to be understood that the embodiment of the invention disclosed herein is illustrative and not restrictive and that the invention may be embodied in other forms or may be modified in various manners within the meaning and scope of the following claims.

Having thus described my invention what I claim as new and desire to secure by Letters Patent is:

1. A motor of the class described comprising a float resting upon the surface of a body of water subject to rising and falling conditions, a drum of large diameter, racks connected to said float and means operatively connecting said racks to said drum to cause rotation of said drum in one direction during the movement of the float in both directions, a companion drum also of large diameter located at a higher level, an endless conveyer having a series of flights passing around said drum, means for delivering mobile articles in the path of the flights of said conveyer whereby each flight will receive a heavy load, means for receiving the mobile articles as discharged from the conveyer as it passes over the uppermost drum and means adapted to be actuated by the mobile articles descending at a relatively high rate of speed under the influence of gravity to transform the potential energy of the descending mobile articles into applied power.

2. A motor of the class described comprising a float resting upon the surface of a body of water subject to rising and falling conditions, a drum of large diameter, racks connected to said float and means operatively connecting said racks to said drum to cause rotation of said drum in one direction, a companion drum located at a higher level, an endless conveyer having a series of flights passing around said drum, means for delivering mobile articles in the path of the flights of said conveyer whereby each flight will receive a heavy load, means for receiving the mobile articles as discharged from the conveyer as it passes over the uppermost drum, and an endless conveyer mounted upon rollers of relatively small diameter and having flights adapted to receive said mobile articles whereby said conveyer will be actuated by gravity to transform the potential energy of the mobile articles into power and means to receive said mobile articles and return the same into the path of the flights of the first mentioned conveyer.

3. A motor of the class described comprising a float, an endless conveyer actuated thereby, cup shaped flights on said conveyer, means for delivering a number of heavy balls successively to each of said cup shaped flights, a receptacle into which the balls are delivered by said conveyer, a second descending conveyer having a series of similar flights each adapted to receive the balls from said receptacle and thereby to cause the actuation of said conveyer, means for regulating the number of balls delivered to the last-named conveyer and means for returning the balls discharged from the second conveyer into the path of the flights of the first conveyer.

In testimony whereof, I have signed my name to this specification, in the presence of two subscribing witnesses.

PETER REED.

Witnesses:
FREDERICK A. TENNANT,
THOMAS J. DRUMMOND.

Copies of this patent may be obtained for five cents each, by addressing the "Commissioner of Patents, Washington, D. C."